United States Patent

Guillot

[15] 3,652,178
[45] Mar. 28, 1972

[54] DEVICE FOR THE OUTPUT SHAFT OF A GAS TURBINE

[72] Inventor: Jack Guillot, Blanc-Mesnil, France
[73] Assignee: Bennes Marrel, Saint-Etienne (Loire), France
[22] Filed: Nov. 20, 1969
[21] Appl. No.: 878,472

[30] Foreign Application Priority Data
Nov. 28, 1968 France.....................................50.688

[52] U.S. Cl..............................415/110, 60/39.32, 415/134, 415/142
[51] Int. Cl....................................................F01d 11/00
[58] Field of Search...................415/77, 110, 112, 134, 140, 415/142; 60/39.32; 417/407, 408, 409

[56] References Cited

UNITED STATES PATENTS

| | | | |
|---|---|---|---|
| 2,470,126 | 5/1949 | Altorfer | 60/39.32 |
| 2,591,399 | 4/1952 | Buckland et al. | 60/39.32 |
| 2,639,579 | 5/1953 | Willgoos | 60/39.32 |
| 2,650,753 | 9/1953 | Howard et al. | 60/39.32 |
| 2,858,975 | 11/1958 | Feilden | 415/111 |
| 3,167,914 | 2/1965 | Savonuzzi | 60/39.32 |
| 3,304,054 | 2/1967 | Oechslin et al. | 415/134 |
| 2,692,724 | 10/1954 | McLeod | 60/39.32 |

Primary Examiner—C. J. Husar
Attorney—Sughrue, Rothwell, Mion, Zinn & Macpeak

[57] ABSTRACT

The output shaft of a gas turbine is journaled by two spaced-apart bearings mounted in a support housing surrounding the shaft. The exhaust for the gas turbine is disposed radially outwardly of the support housing and an insulating sleeve is disposed intermediate the exhaust and the support housing. One of the bearings is fixed axially relative to the shaft and the support housing while the other bearing is mounted for limited axial play relative to the support housing and the shaft. Helical splines are formed on the shaft adjacent the rotor and cooperate with a circumferential sleeve to form a pump which will draw atmospheric air between the insulating sleeve and the support housing, through passages in the bearing body and direct the air against the axially movable bearing to cool the same.

4 Claims, 5 Drawing Figures

DEVICE FOR THE OUTPUT SHAFT OF A GAS TURBINE

The present invention relates to an improved bearing device for the output shaft of a gas turbine.

It is known that in a gas turbine, the output shaft bearing is subjected to high stresses during delivery of power produced by the turbine to a driven apparatus. This bearing works under very severe conditions, since it is subjected to not only stress but to a considerable heating. Finally, the great speed at which this shaft may turn (e.g., more than 40,000 revolutions per minute) calls for a perfect centering of the bearing.

This design of such a bearing is particularly complicated in the case of a gas turbine for a vehicle such as a lorry, since the bearing must function well at all loads and speeds.

The present invention has for its object to provide a rear bearing for a gas turbine capable of providing accurate centering of the rotating shaft under all conditions.

In a preferred embodiment, the bearing is kept cool both by means of a circulation of atmospheric air drawn along the length of the external shells of the support under the effect of a power pump on the rotating shaft, this air circulation being particularly effective across the channels bored in the body of the bearing, and by lagging surrounding it.

Reference should now be made to the accompanying drawings, in which.

Figure 1:
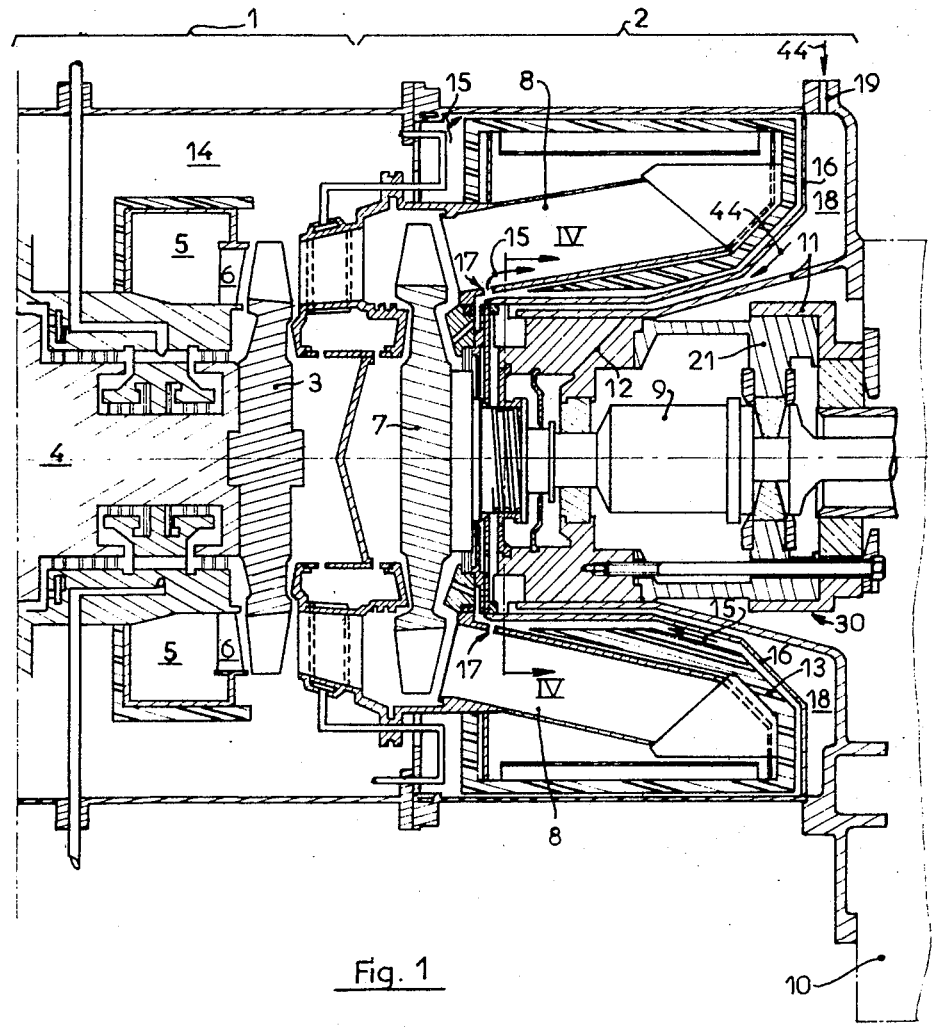
FIG. 1 is an axial section of a gas turbine provided with a rear bearing according to the invention.

The drawings show a rear bearing for a gas turbine.

This turbine essentially comprises a compressor stage 1 and a power stage 2. The compressor stage includes a rotor of a centrifugal compressor (not shown) which is connected to a rotor of a high pressure turbine 3, both fixed on the same primary shaft 4. The hot gases, compressed in combustion chambers (not shown), are fed into an annular collector 5 to thereafter pass through the fixed blades of a primary deflector 6, and then through the rotating blades of the high pressure rotor 3. Downstream of this high pressure rotor 3, the hot gases pass into a low pressure deflector, then on to the rotating blades of the rotor of a low pressure turbine 7, at the exit of which they are collected in an exhaust pipe 8, and thence to atmosphere.

The low pressure rotor 7 is fixed on a secondary shaft 9 which supplies the power output of the turbine. This shaft 9 carries a reducing gear 10 which is shown schematically in FIG. 1.

The device of the invention concerns the whole of the rear bearing of the turbine, i.e., the bearing which supports the shaft 9 between the rotor 7 and the reducing gear 10. This bearing comprises two main elements, a support housing 11 and a bearing body 12.

The support housing 11 is extremely rigid and is preferably cast in one piece. It therefore constitutes a particularly stable seat for the body 12 of the bearing. To ensure a good thermal isolation, the internal face of the exhaust 8 is covered by lagging 13 (FIG. 1). Air under very low pressure circulates over the external face of this lagging 13, the air being derived by recovery, at the level of the central bearing of the compressor, of air leaking from the compressor rotor, this air following the direction of arrows 15 between the lagging 13 and a steel cover 16, to finally mix with the exhaust gas by passing through orifices 17 provided in the exhaust 8 immediately downstream of the low pressure rotor 7.

Between the cover 16 and the bearing support 11, there is a chamber 18 in the form of a truncated cone. This chamber is connected to the external air by a series of peripheral perforations 19. It is connected with the internal space of the support 11, by orifices 20 (FIG. 3) near the downstream end of the low pressure turbine 7.

The bearing body 12 is connected to a rear block 21. The body 12 comprises an external cylindrical face which is a sliding fit in 74 support 11. In the interior of the body 12 there is a bearing 23 (FIG. 2) in which a journal surface 24 of the shaft 9 rotates. The block 21 is provided with an internal bearing 25 (FIG. 5) engaging between two flanges 26 and 27 on the shaft 9. Lateral shims 28 and 29 guide the external cylindrical faces of the flanges 26 and 27. The block 21 is fixed in a central housing 30 of the support 11. Since the block 21 and the bearing 25 are rigidly integral with this housing 30 and the block 11, they ensure correct axial positioning of the shaft 9. As the axial length 31 of the journal 24 is greater than the axial length 32 of the bearing 23, it will be seen that expansion and contraction of the shaft 9 can take place without introducing axial reactions onto this bearing 23.

Four screws 22 (FIG. 4) fasten the block 21 to the body 12. This body must be able to slide when hot in the support 11 under the effect of expansion, while maintaining accurate centering of the bearing 23, whatever the temperature. For this three axial screws 33 are used, each of which engages with its head 34 on the block 12 while its other end engages in a thread of a boss 35 on the downstream face of the low pressure turbine 7. Tightening the screws 33 secures a series of fixed deflectors 36, there being three collars 37 between the body 12 and the bosses 35. The three collars 37 are located at 120° around the shaft 9. Each of them is axially arranged, and extend out of the external cylindrical face of the body 12 to engage itself on a longitudinal keyway 38 on the front of the fixed support 11.

Tightness of the junction between the body 12 and the exhaust 8 or the sheet metal 16 is assured by the seals 39 and 40 which allow relative sliding of these parts during heating and expansion.

Figure 2:
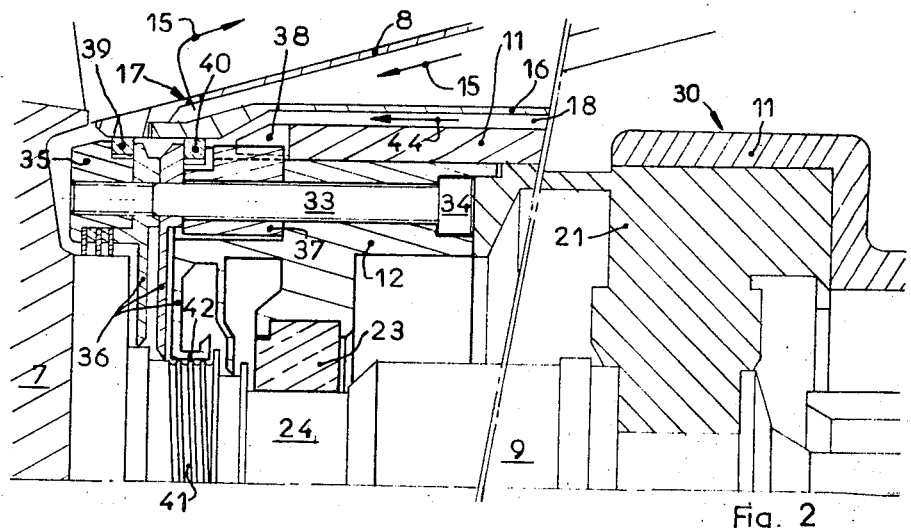
FIG. 2 is a section along the line II—II (FIG. 4).
Figure 3:
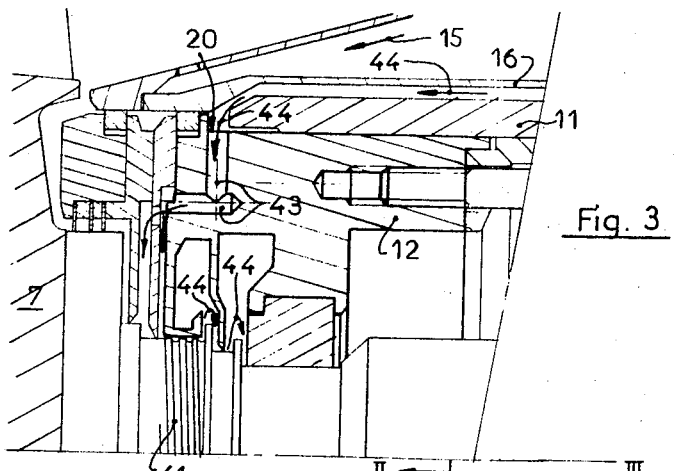
FIG. 3 is a section along the lines III—III (FIG. 4).

For an internal seal there is a thread 41 on the shaft 9 which turns in the interior of a plain cylindrical face 42 of one of the fixed deflectors 36, so as to constitute a screw pump capable of blowing fresh air from the chamber 18 through the openings 20 of the support 11 and of the drilling 43 in the front of the body 12 in the direction of the bearing 23, as indicated by the arrows 44 (FIGS. 1, 2 and 3).

The assembly operates as follows:

When the turbine rotates, the bearing support 11 is maintained cool by the different currents of air (arrows 15 and 44, FIGS. 2 and 3 this being assisted by the presence of the lagging 13. This circulation of air is created partly by the pump 41, 42 (which also acts as a seal) which blows fresh air in the direction of the bearing 23. The centering of the body 12 of the bearing 12 which slides in the support 11 under the effect of expansion, is effected by the collars 37.

Figure 4:
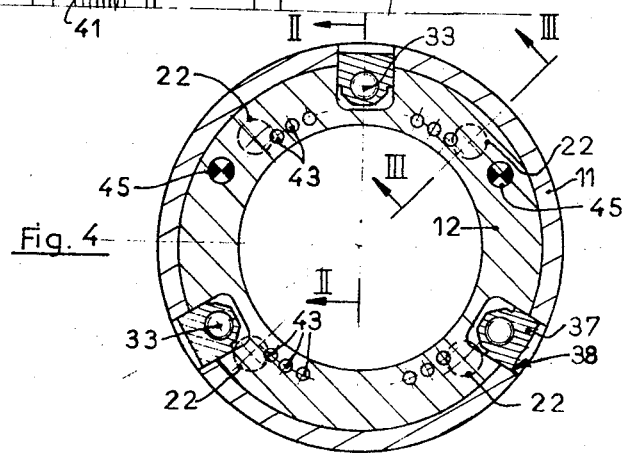
FIG. 4 is a section along the line IV—IV (FIGS. 1 and 2).

To complete the centering of the body 12 on the block 21, there are two centering feet 45 (FIG. 4).

Figure 5:
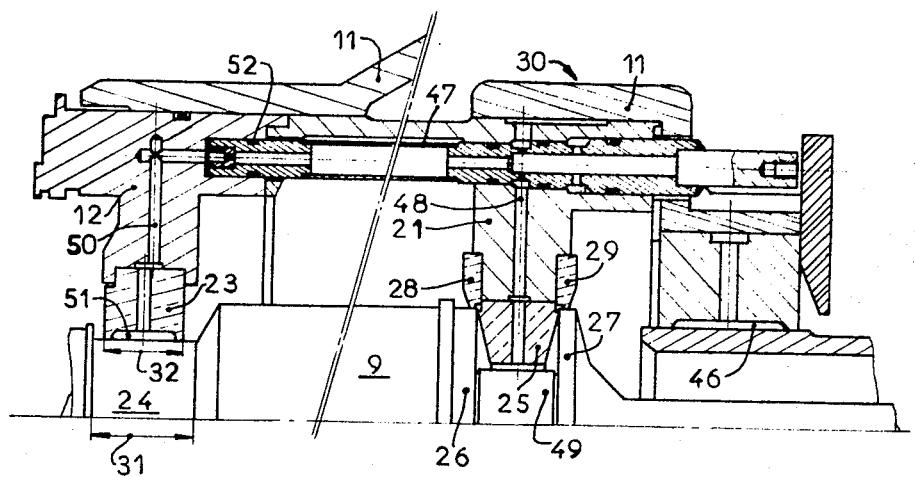
FIG. 5 is an axial section showing on an enlarged scale a detail of FIG. 1, and illustrating the method of axially positioning and lubricating the shaft.

Lubrication of the bearings 25, 28, 29, 23, is effected by means of an annular oil reservoir 46 (FIG. 5). A channel 47, disposed longitudinally in the block 21, effects distribution of oil to a radial channel 48 which opens out between the bearing 25 and the adjacent journal 49 of the shaft 9. This channel 47 connects with channel 50 in the body 12 to an oil reservoir 51 being defined between the bearing 23 and the journal 24. The sliding junction between the channel 47 and the body 12 is provided with a seal 52.

What we claim is:

1. A bearing arrangement for a gas turbine having an output shaft disposed radially inwardly of the exhaust means comprising support housing means disposed intermediate said shaft and said exhaust means, insulating means intermediate said exhaust means and said support housing means, two spaced apart bearing means mounted on said support housing means and disposed in bearing engagement with said shaft, means for axially fixing one of said bearing means relative to said output shaft and said support housing means, a plurality of angularly spaced collar means supporting the other of said bearing means in said support housing means for axial movement relative thereto and passage means for supplying cooling air to the other of said bearing means.

2. A bearing arrangement as set forth in claim 1 wherein said axially movable bearing means is comprised of a bearing body in engagement with said support housing means and a bearing ring in engagement with said output shaft, said bearing body having cooling passages formed therethrough, screw pump means formed on said output shaft adjacent said bearing ring for drawing atmospheric air along the full length of the exterior of said support housing means through said cooling passage means in said bearing body and directing the atmospheric air against said bearing ring.

3. A bearing ring as set forth in claim 2 further comprising fluid passage means disposed in said bearing means for supplying lubricating fluid to the bearing surfaces between said two spaced-apart bearing means and said output shaft.

4. A bearing arrangement as set forth in claim 2 further comprising additional housing means disposed intermediate said insulating means and said support housing means to define a passageway between said insulating means and said additional housing means to provide for the flow of additional cooling air.

* * * * *